(12) United States Patent
Zhong et al.

(10) Patent No.: US 10,943,566 B1
(45) Date of Patent: Mar. 9, 2021

(54) SCREEN-OFF DISPLAY METHOD AND APPARATUS

(71) Applicant: BEIJING XIAOMI MOBILE SOFTWARE CO., LTD., Beijing (CN)

(72) Inventors: Guilin Zhong, Beijing (CN); Yuan Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,301

(22) Filed: Nov. 29, 2019

(30) Foreign Application Priority Data

Aug. 29, 2019 (CN) .......................... 201910809867.4

(51) Int. Cl.
*G09G 5/395* (2006.01)
*G06T 9/00* (2006.01)
*G09G 5/393* (2006.01)

(52) U.S. Cl.
CPC .............. *G09G 5/395* (2013.01); *G06T 9/00* (2013.01); *G09G 5/393* (2013.01); *G09G 2340/02* (2013.01)

(58) Field of Classification Search
None
See application file for complete search history.

(56) References Cited

U.S. PATENT DOCUMENTS

| 5,675,826 | A  | * | 10/1997 | Manze | G06T 7/223 345/574 |
| 5,961,617 | A  |   | 10/1999 | Tsang | |
| 6,272,180 | B1 | * | 8/2001  | Lei | H04N 19/63 375/240.16 |
| 8,766,919 | B1 | * | 7/2014  | Lachwani | G06F 1/3265 345/168 |
| 2006/0277497 | A1 | * | 12/2006 | Minagawa | H04L 67/04 715/819 |
| 2016/0077606 | A1 | * | 3/2016  | Hyun | G06F 3/0484 345/156 |
| 2017/0308226 | A1 | * | 10/2017 | Yoo | G06F 3/0488 |
| 2018/0157452 | A1 | * | 6/2018  | Nelson | G09G 5/377 |

FOREIGN PATENT DOCUMENTS

EP 3324388 A1 5/2018

OTHER PUBLICATIONS

European Patent Office, Extended European Search Report Issued in Application No. 19215184.3, dated Jun. 25, 2020, Germany, 10 pages.

* cited by examiner

*Primary Examiner* — Joni Hsu
(74) *Attorney, Agent, or Firm* — Syncoda LLC; Feng Ma (57) ABSTRACT

A screen-off display method includes: in response to a screen-off trigger operation, compressing image data of at least two images to be displayed and storing the compressed image data in the memory; and controlling the display screen to display images according to the image data in the memory.

16 Claims, 4 Drawing Sheets

SCREEN-OFF DISPLAY METHOD AND APPARATUS

CROSS-REFERENCE TO RELATED APPLICATION

This application claims priority to Chinese Patent Application No. 201910809867.4 filed on Aug. 29, 2019, the disclosure of which is hereby incorporated by reference in its entirety.

BACKGROUND

In order to improve user experience, a display device such as a mobile phone typically supports a screen-off display function. With this screen-off display function, the display device may still display a set picture such as time and icon even in a screen locking state.

SUMMARY

The present disclosure relates generally to display technologies, and more specifically to a screen-off display method, and a screen-off display apparatus.

According to a first aspect of the present disclosure, there is provided a screen-off display method applied to a processor of a display device. The display device further includes a display screen and a memory. The method includes the following contents. In response to a screen-off trigger operation, image data of at least two images to be displayed is compressed and stored in the memory. The display screen is controlled to display images according to the data image stored in the memory.

In some embodiments, the compressing the image data of at least two images to be displayed and storing the compressed image data in the memory includes: compressing the image data of at least two images to be displayed at a preset compression ratio and storing the compressed image data in the memory.

In some embodiments, the compressing the image data of at least two images to be displayed at the preset compression ratio and storing the compressed image data in the memory includes: sending a partitioning instruction to the memory so that a storage region of the memory is partitioned into a plurality of sub-storage regions; and compressing the image data of the at least two images to be displayed at the preset compression ratio respectively and storing the compressed image data in different sub-storage regions.

In some embodiments, the at least two images to be displayed are selected from consecutive frames of images of one segment of animation.

In some embodiments, the display device further includes a display controller. the controlling the display screen to display images according to the image data in the memory includes: The display controller decompresses the image data in the memory, and the display controller controls the display screen to display according to decompressed image data based on a preset displaying criterion.

In some embodiments, the preset displaying criterion includes: a display sequence of at least two images to be displayed, a display position of each image to be displayed, and a display time length of each image to be displayed. The compressing the image data of at least two images to be displayed and storing the compressed image data in the memory further includes: compressing information of the preset displaying criterion and storing the compressed information in the memory In some embodiments, after the controlling the display screen to display images according to the image data in the memory, the method further includes: in response to a trigger operation for updating images, image data of an updated image is compressed and stored in the memory.

In some embodiments, the method further includes: in response to awakening trigger operation, awakening the display screen.

According to a second aspect of the present disclosure, there is provided a screen-off display apparatus. The screen-off display apparatus being applied to a processor of a display device, and the display device further comprising a display screen and a memory. The apparatus includes: a compressing-and-storing module and a displaying module. The compressing-and-storing module is configured to compress image data of at least two images to be displayed and store the compressed image data in the memory in response to a screen-off trigger operation. A displaying module is configured to control the display screen to display images according to the image data in the memory.

According to a third aspect of the present disclosure, there is provided a display device. The display device includes a display screen, a memory configured to store different types of data including instructions and a processor. The processor is configured to: in response to a screen-off trigger operation, compress image data of at least two images to be displayed and store the compressed image data in the memory; and control the display screen to display images according to the image data stored in the memory.

It should be understood that the above general description and the following detailed description are exemplary and explanatory, and should not limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION

Examples will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present disclosure. On the contrary, they are examples of an apparatus and a method consistent with some aspects of the present disclosure described in detail in the appended claims.

Terms used herein are used to only describe a particular example rather than limit the present disclosure. Unless otherwise defined, technical terms or scientific terms used in the present disclosure should have general meanings that can be understood by ordinary persons of skill in the art. "First" "second" and the like used in the specification and claims do not represent any sequence, quantity or importance, but distinguish different components. Similarly, "one" or "a" and the like do not represent quantity limitation but represent at least one. Unless otherwise stated, "include" or "contain" or the like is intended to refer to that an element or object appearing before "include" or "contain" covers an element or object or its equivalents listed after "include" or "contain" and does not preclude other elements or objects. "Connect" or "connect with" or the like is not limited to physical or mechanical connection but includes direct or indirect electrical connection.

The singular forms such as "a," 'said," and "the" used in the present disclosure and the appended claims are also intended to include multiple, unless the context clearly indicates otherwise. It is also to be understood that the term "and/or" as used herein refers to any or all possible combinations that include one or more associated listed items.

Before the technical solutions of the examples of the present disclosure are described, hardware foundation of a display device supporting screen-off display function can be first introduced. The display device includes but not limited to a mobile phone, a tablet computer, a wearable device such as smart watch and wristband, a vehicle-mounted device and a medical device and so on.

Various embodiments of the present disclosure can address the high energy consumption in some screen-off display methods of display devices.

Figure 1:
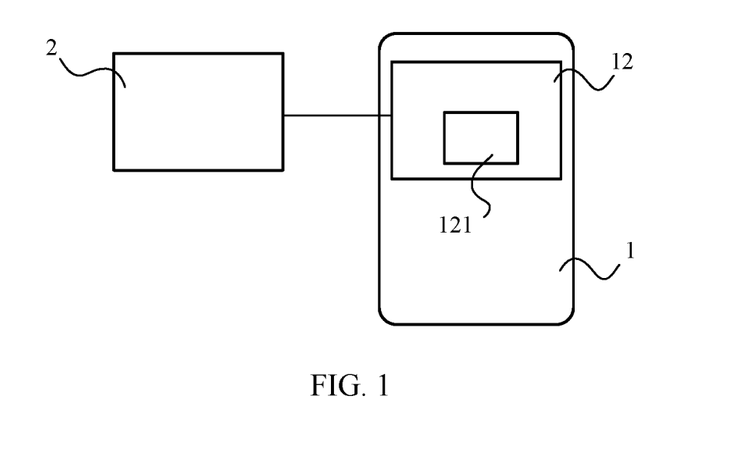
FIG. 1 is a schematic diagram illustrating a display device for supporting screen-off display function according to an example of the present disclosure.

FIG. 1 is a schematic diagram illustrating a display device for supporting screen-off display function according to an example of the present disclosure. As shown in FIG. 1, the display device includes a display screen 11, a display controller 12, a memory 121 and a processor 2. A display screen module is formed by the display screen 11 and the display controller 12.

The display screen 11 includes a plurality of pixels. One pixel includes at least one red sub-pixel, one blue sub-pixel and one green sub-pixel. By enabling different sub-pixels in the pixel, the pixel presents different colors according to a principle of optical primary color superimposition.

Each pixel in the display screen 11 can emit light independently. Illustratively, the display screen 11 is an Organic Light-Emitting Diode (OLED) display screen, or a Light-Emitting Diode (LED) display screen.

The display controller 12 is configured to control the display screen 11 for display. Specifically, the display controller 12 controls the pixels of the display screen 1 to be enabled according to image data. The image data refers to digital signals including RGB data of each pixel. The display controller 12 converts the image data into an electrical signal so that the sub-pixels of each pixel are controlled by a driving circuit to emit light. Further, the display controller 12 controls the pixel to present a desired color and further controls a plurality of pixels to be enabled so that the display screen displays a desired image.

The memory 121 is a storing unit of the display controller 12 and used for temporarily storing image data of one frame of image. When the display screen displays a static image, the display controller 12 controls the display screen 11 to display the image by reading the image data temporarily stored in the memory 121.

The processor 2 is a Central Processing Unit (CPU) of the display device. The processor is 2 in data communication with the display controller 12 and the memory 121 through a Mobile Industry Processor Interface (MIPI) bus. The processor 2 may send a control instruction to the display controller 12 through the MIPI bus or transmit image data through the MIPI bus to temporarily store the image data in the memory 121.

In a screen-off (i.e., screen locking) state, the display controller 12 controls the display screen 11 to locally display a set image such as time and icon, and controls the pixels of the display screen 11 in a region for displaying image to be disabled, thereby realizing screen-off display function.

In some examples, when at least two images (for example, dynamically changing time image) are displayed in the screen-off state, because capacity of the memory 121 is only available for storing image data of one frame of image temporarily, the processor 2 is required to transmit image data of an updated image to the display controller 12 in real time. As a result, the display controller 12 still needs to participate in screen-off display in a case that the display device is in the sleeping state, increasing device energy consumption and affecting user experiences.

Based on the above, a screen-off display method, a screen-off display apparatus, a processor and a display device are provided according to some examples of the present disclosure, to reduce energy consumption of displaying animation effect in a screen-off state, thereby optimizing user experiences.

Figure 7:
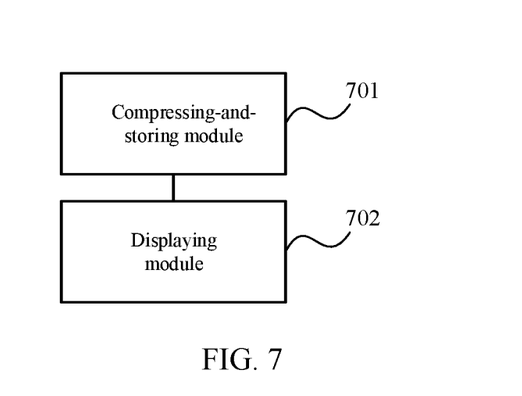
FIG. 7 is a block diagram illustrating a screen-off display apparatus according to an example of the present disclosure.
Figure 8:
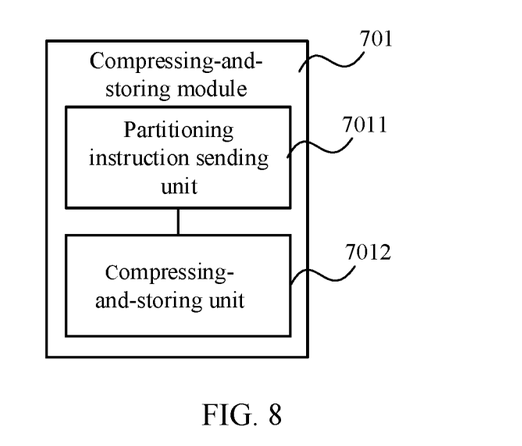
FIG. 8 is a block diagram illustrating a screen-off display apparatus according to another example of the present disclosure.
Figure 9:
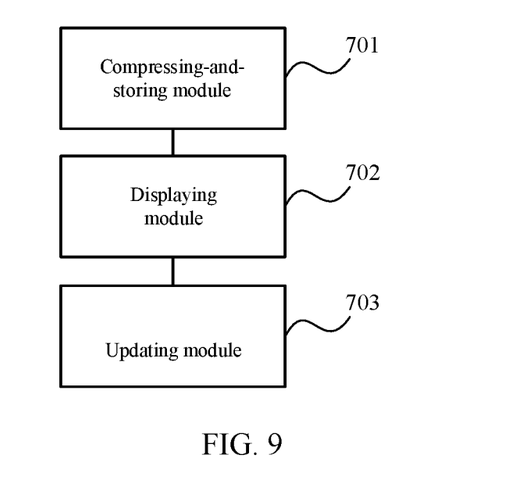
FIG. 9 is a block diagram illustrating a screen-off display apparatus according to another example of the present disclosure.
Figure 10:
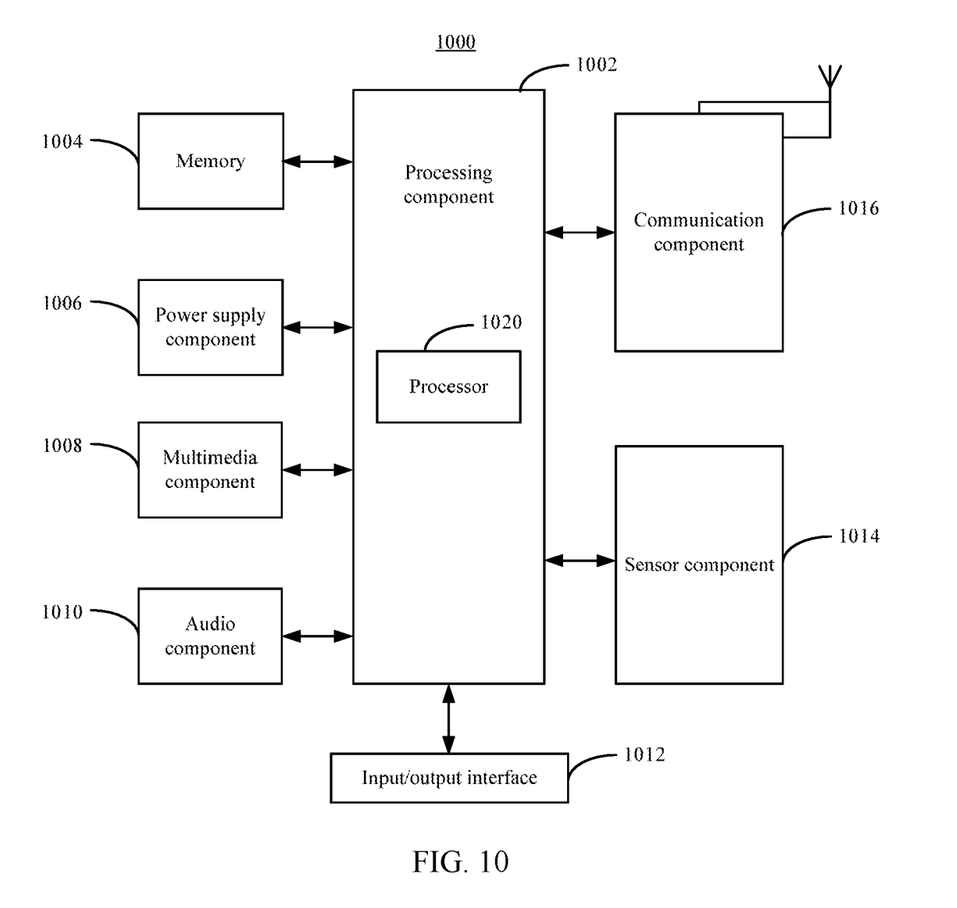
FIG. 10 is a block diagram illustrating a display device according to an example of the present disclosure.

FIGS. 2, 3, 5 and 6 are flowcharts illustrating a screen-off display method according to different examples. FIG. 4 is a block diagram illustrating a memory in a screen-off display apparatus according to an example of the present disclosure. FIGS. 7-9 are block diagrams illustrating a processor according to different examples. FIG. 10 is a block diagram illustrating a display device according to an example of the present disclosure.

Figure 2:
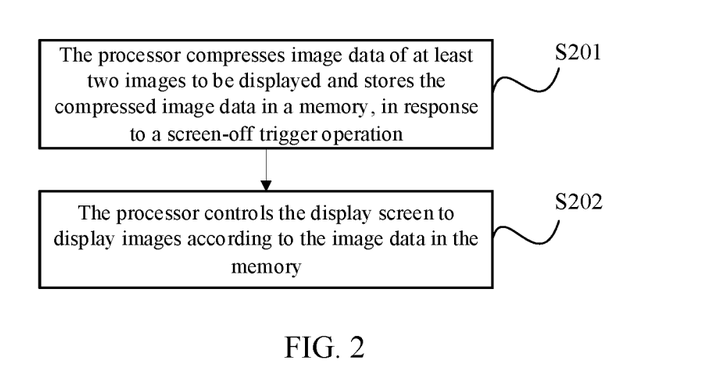
FIG. 2 is a flowchart illustrating a screen-off display method according to an example of the present disclosure.

According to a first aspect of the present disclosure, a screen-off display method is provided, which is applied to a processor of the display device shown in FIG. 1. As shown in FIG. 2, the screen-off display method includes the following blocks.

At block S201, the processor compresses image data of at least two images to be displayed and stores the compressed image data in a memory, in response to a screen-off trigger operation.

The screen-off trigger operation includes but not limited to: triggering a screen-off button (for example, a physical button or a virtual button), time length of disabling the touch screen reaching a preset threshold, or identifying a voice screen-off instruction. The image to be displayed is an image displayed by the display screen in a screen-off state. Generally, a display area of the image to be displayed is smaller or equal to 1/10 of a total display area of the display screen. As a result, the compression-storage of the image data of the images to be displayed has no large impact on the image display quality in block S201. In this case, a good display effect is maintained and user experiences are guaranteed.

In an example, the image data of at least two images to be displayed are compression-stored in the memory at a preset compression ratio in block S201. For example, the preset compression ratio is at least 2:1. For another example, the preset compression ratio is 3:1, 4:1, 5:1 or 6:1 or the like. if the display area of the images to be displayed is 1/10 of the total display area of the display screen and the compression ratio is preset to 2:1, the memory can store image data of at least 20 images to be displayed. When the images to be displayed are black-and-white images, the compression ratio may be further increased to increase the number of images storable in the memory.

Figure 3:
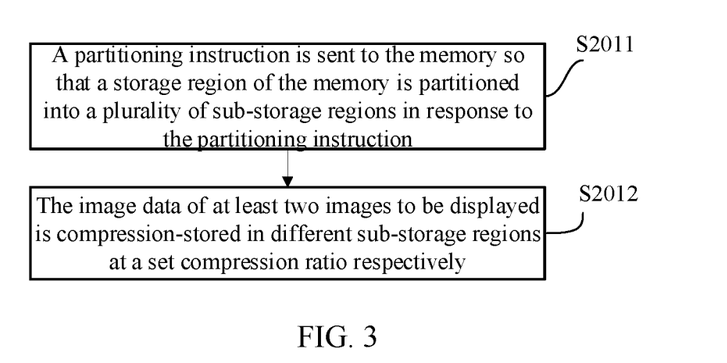
FIG. 3 is a flowchart illustrating a screen-off display method according to another example of the present disclosure.
Figure 4:
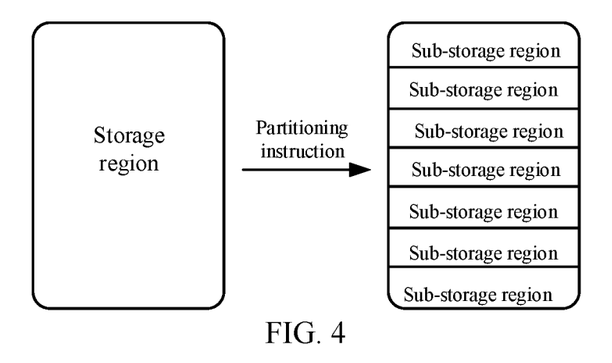
FIG. 4 is a schematic diagram illustrating a state of a memory in a screen-off display method according to an example of the present disclosure.

In an example, as shown in FIG. 3, block S201 specifically includes the following blocks.

At block S2011, a partitioning instruction is sent to the memory so that a storage region of the memory is partitioned into a plurality of sub-storage regions in response to the partitioning instruction.

As shown in FIG. 4, in a normal display state, the capacity of the memory is available for temporarily storing image data of one frame of image. The image is an image displayed in an entire display region of the display screen rather than an image locally displayed on the display screen.

When the memory receives the partitioning instruction from the processor, the storage region is partitioned into a plurality of sub-storage region. In this way, the processor is helped to compress the image data of at least two images to be displayed.

At block S2012, the image data of at least two images to be displayed is compression-stored in different sub-storage regions at a preset compression ratio respectively.

In some embodiments, the image data to be displayed is stored in the sub-storage regions of the memory one to one. In this way, image data of one complete image to be displayed can be obtained by one reading operation.

In an example, block S201 further includes storing a preset displaying criterion in the memory. The preset displaying criterion includes a display sequence of at least two images to be displayed, for example, sequential play, cyclic play or partially cyclic play, a display time length of each image to be displayed, and a display position of each image to be displayed.

Specifically, the preset displaying criterion is stored in the memory through the MIPI bus. In some embodiments, the preset displaying criterion is stored in a region different from those regions storing image data in the memory. In some embodiments, the preset displaying criterion and the image data are stored in the sub-storage regions one to one. Specifically, one sub-storage region stores image data of one image to be displayed, a display sequence number corresponding to the image to be displayed, a display time length corresponding to the image to be displayed, and a set display position corresponding to the image to be displayed.

As a result, the display controller controls the display screen to display a desired display effect by reading the preset displaying criterion pre-stored in the memory.

Further, the preset displaying criterion is transmitted by the processor to the memory through the MIPI bus. Thus, in some embodiments, the display device may provide a display rule for selecting a window to realize personalized display and optimize user experiences. Illustratively, a virtual button is provided as a selection window on the display screen and one virtual button corresponds to one display rule.

In an example, the at least two images to be displayed are selected from consecutive frames of images of one segment of animation. Therefore, animation may be displayed on the display screen by use of image data of at least two images to be displayed in the memory based on properly-selected display sequence and display time length. Further, the processor is not involved in the animation display.

At block S202, the processor controls the display screen to display images according to the image data in the memory.

When monitoring a screen-off trigger operation, the processor sends a screen-off instruction to the display controller which controls the display screen to be in a screen-off state. Further, the processor controls the display controller to control the display screen for screen-off display according to the image data in the memory. Here, the functional modules of the display device other than the display screen are in sleeping state.

Figure 5:
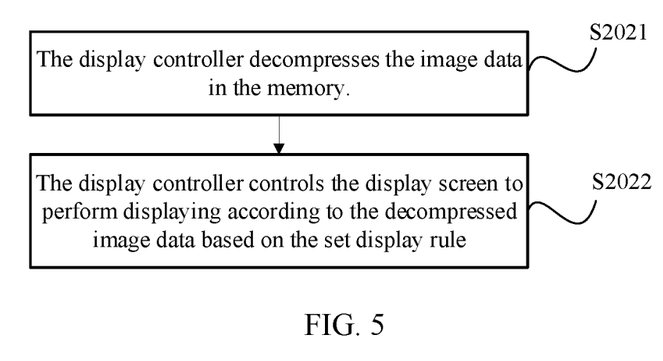
FIG. 5 is a flowchart illustrating a screen-off display method according to another example of the present disclosure.

As shown in FIG. 5, the display screen in block S202 may display an image through the following blocks.

At block S2021, the display controller decompresses the image data in the memory.

At block S2022, the display controller controls the display screen for display according to the decompressed image data based on the preset displaying criterion.

The preset displaying criterion includes a display sequence of at least two images to be displayed, a display position of each image to be displayed, and a display time length of each image to be displayed. The preset displaying criterion is pre-stored in the memory by the processor. At block S2022, the display controller needs to read the preset displaying criterion to control the display screen for display.

The display controller performs reading in the following optional manner. In some embodiments, the display controller firstly reads the display sequence, then reads the image data of the first image to be displayed and the display position and the display time length both corresponding to the first image to be displayed according to the display sequence. Further, after controlling the display screen to display the first image, the display controller continues to read the display position and the display time length of the second image to be displayed, so as to control the display screen to display the second image.

In the screen-off display method according to the examples of the present disclosure, the image data of at least two images is compression-stored in the memory, and the display screen is controlled for display according to the image data temporarily stored in the memory during screen-off display. Thus, during the process of displaying at least two images in a screen-off state, it is not required to update image data in real time so that a part of the processor used for display is in a sleeping state, reducing energy consumption and optimizing user experiences.

Figure 6:
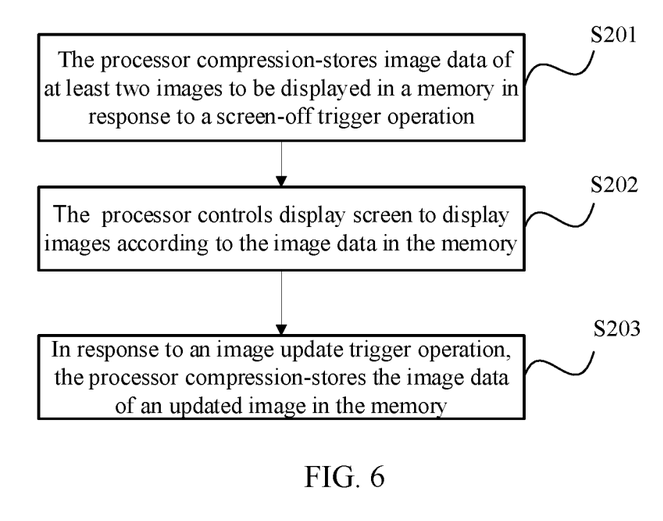
FIG. 6 is a flowchart illustrating a screen-off display method according to another example of the present disclosure.

In an example, as shown in FIG. 6, after block S202, the screen-off display method further includes block S203. At block S203, in response to a trigger operation for updating images, the processor compresses the image data of an updated image and stores the compressed image data in the memory.

In some embodiments, in the trigger operation for updating images, the display screen displays all images stored in the memory in a set sequence.

Taking Screen-off display time for example, the image data of 10 images is stored temporarily in the memory, and the 10 images include an image of each minute from 16:15 to 16:25. A trigger condition for image update request is defined that, the trigger condition is reached after the 10 images, i.e., all images stored in the memory, are displayed in sequence. Here, the processor compresses the image data of the updated images and stores the compressed image data in the memory. For example, the processor stores the image data of the image of each minute from 16:11 to 16:36 to control the display screen to maintain screen-off display.

In some embodiments, the trigger condition for image update request is defined that the display time length of the display screen reaches a preset threshold.

Taking an animation background for example, the display time of the animation background is set to three minutes. Therefore, when the display time of a first image group displayed in a screen-off state reaches three minutes, the processor compresses the image data of the updated images and stores the compressed image data in the memory. For example, the processor compresses image data of a second image group t and stores the compressed image data in the memory.

In an example, the screen-off display method further includes: in response to a wakening trigger operation, awakening the display screen. The awakening trigger operation includes but not limited to triggering an awakening button (for example, a physical button or a virtual button) or identifying a voice awakening instruction.

As described above, in the screen-off display method according to the examples of the present disclosure, the processor is not required to update image data when a plurality of images are displayed, thereby reducing energy consumption of the display device and optimizing user experiences.

According to a second aspect of the present disclosure, a screen-off display apparatus is provided. The screen-off display apparatus may be applied to a display device shown in FIG. 1. In FIG. 7, the screen-off display apparatus includes a compressing-and-storing module 701 and a displaying module 702.

The compressing-and-storing module 701 is configured to compress image data of at least two images to be displayed and store the compressed image data in a memory in response to a screen-off trigger operation.

The displaying module 702 is configured to control a display screen to display images according to the image data in the memory.

In an example, the compressing-and-storing module 701 is further configured to compress the image data of at least two images to be displayed at a set compression ratio and store the compressed image data in the memory.

In an example, as shown in FIG. 8, the compressing-and-storing module 701 includes a partitioning instruction sending unit 7011 and compressing-and-storing unit 7012.

The partitioning instruction sending unit 7011 is configured to send a partitioning instruction to the memory so that a storage region of the memory is partitioned into a plurality of sub-storage regions in response to the partitioning instruction.

The compressing-and-storing unit 7012 is configured to compress the image data of at least two images to be displayed at the preset compression ratio respectively and store the compressed image data in different sub-storage regions.

In an example, the at least two images to be displayed are selected from consecutive frames of images of one segment of animation.

In an example, the display device further includes a display controller which is used to decompress the image data stored in the memory and control a display screen for display according to the decompressed image data based on a preset displaying criterion.

In an example, the preset displaying criterion includes a display sequence of at least two images to be displayed, a display position of each image to be displayed, and a display time length of each image to be displayed. When compressing the image data of at least two images to be displayed and storing in the memory, the compressing-and-storing module 701 is further configured to store information of the preset displaying criterion in the memory.

In an example, as shown in FIG. 9, the screen-off display apparatus further includes an updating module 703. The updating module 703 is configured to compress image data of updated images to be stored in the memory in response to a trigger operation for updating images.

In an example, the screen-off display apparatus further includes an awakening module. The awakening module is configured to awaken the display screen in response to an awakening trigger operation.

According to a third aspect of the present disclosure, a processor is provided. The processor is configured to perform the screen-off display method according to the above first aspect.

According to a fourth aspect of the present disclosure, a display device is provided. The display device includes a display screen, a memory and the processor according to the third aspect. FIG. 10 is a schematic diagram illustrating a display device 1000 according to an example of the present disclosure. For example, the display device 1000 may be a mobile phone, a computer, a digital broadcast display device, a message transceiver, a game console, a tablet device, a medical device, a fitness device and a personal digital assistant and so on.

As shown in FIG. 10, the display device 1000 may include one or more of a processing component 1002, a memory 1004, a power supply component 1006, a multimedia component 1008, an audio component 1010, an input/output (I/O) interface 1012, a sensor component 1014 and a communication component 1016.

The processing component 1002 generally controls the overall operation of the display device 1000, such as operations associated with display, phone call, data communication, camera operation, and recording operations. The processing component 1002 may include one or more processors 1002 to execute instructions to complete all or a part of the blocks of the above method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store different types of data to support operation at the display device 1000. Examples of such data include instructions, contact data, phonebook data, messages, pictures, videos, and so on for any application or method that operates on the display device 1000. The memory 1004 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 1006 may provide power for different components of the display device 1000. The power supply component 1006 may include a power supply management system, one or more power sources, and other components associated with generating, managing and distributing power for the display device 1000.

The multimedia component 1008 includes a screen providing an output interface between the display device 1000 and a user. In some examples, the screen may include a Liquid Crystal Display (LCD) and/or a Touch Panel (TP). In some embodiments, an organic light-emitting diode (OLED) display or other types of displays can be adopted.

If the screen includes a touch panel, the screen may be implemented as a touch screen to receive an input signal from a user. The touch panel includes one or more touch sensors to sense touch, slip and gestures on the touch panel. The touch sensor may not only sense the boundary of a touch or slip operation but also detect duration and pressure relating to the touch or slip operation. In some examples, the multimedia component 1008 may include a front-facing camera and/or a rear camera. When the display device 1000 is in an operating mode, such as in a shooting mode or a video mode, the front-facing camera and/or the rear camera may receive external multimedia data. Each of the front-facing camera and the rear camera may be a fixed optical lens system or may be capable of focal length and optical zoom.

The audio component 1010 is configured to output and/or input an audio signal. For example, the audio component 1010 includes a microphone (MIC). When the display device 1000 is in an operating mode, for example, in a call mode, a recording mode or a speech recognition mode, the microphone is configured to receive an external audio signal. The received audio signal may be further stored in the memory 1004 or sent via the communication component 1016. In some examples, the audio component 1010 also includes a speaker for outputting an audio signal.

The I/O interface 1012 provides an interface between the processing component 1002 and a peripheral interface module. The peripheral interface module may be a keyboard, click wheel, a button and the like. Such buttons may include but not limited to: a home button, a volume button, a start button and a lock button.

The sensor component 1014 includes one or more sensors for evaluating states of the display device 1000 in different aspects. For example, the sensor component 1014 may detect the on/off state of the display device 1000, and relative locations of units, for example, the unit is a display and a keypad of the display device 1000. The sensor component 1014 may also detect a position change of the display device 1000 or one component of the display device 1000, the presence or absence of contact of a user with the display device 1000, an orientation or acceleration/deceleration of the display device 1000 and a temperature change of the display device 1000. The sensor component 1014 may include a proximity sensor configured to detect presence of a nearby object without any physical contact. The sensor component 1014 may also include an optical sensor, such as a CMOS or CCD image sensor to be used in imaging application. In some examples, the sensor component 1014 may also include an acceleration sensor, a gyroscope sensor, a magnetic sensor, a distance sensor, a pressure sensor, or a temperature sensor.

The communication component 1016 is configured to facilitate wired or wireless communication between the display device 1000 and other devices. The display device 1000 may access a wireless network based on a communication standard, such as WIFI, 2G or 3G, or a combination thereof. In an example, the communication component 1016 may receive a broadcast signal or broadcast-related information from an external broadcast management system via a broadcast channel. In an example, the communication component 1016 may also include a Near Field Communication (NFC) module to facilitate short-range communications. For example, the NFC module may be implemented based on Radio Frequency Identification (RFID) technology, Infrared Data Association (IrDA) technology, Ultra-Wide Band (UWB) technology, Bluetooth (BT) technology and other technology.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

In an example, the display device 1000 may be implemented by one or more of an Application-Specific Integrated Circuit (ASIC), a Digital Signal Processor (DSP), a Digital Signal Processing Device (DSPD), a Programmable Logical Device (PLD), a Field Programmable Gate Array (FPGA), a controller, a microcontroller, a microprocessor or other electronic elements to perform the above method.

In an example, a non-transitory computer readable storage medium including instructions is provided, for example, the memory 1004 including instructions. The above instructions are executed by the processor 1020 of the display device 1000 to complete the above method. For example, the non-transitory computer readable storage medium may be a Read-Only Memory (ROM), a Random-Access Memory (RAM), a CD-ROM, a magnetic tape, a floppy disk and optical data storage device and the like.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

We claim:

1. A screen-off display method, the method being applied to a processor of a display device, the display device further comprising a display screen, and memory having a plurality of sub-storage regions, and the method comprising:
   in response to a screen-off trigger operation, compressing image data of at least two images to be displayed and storing the compressed image data in the memory, wherein the image data of each of the at least two images to be displayed is stored in each of the plurality of sub-storage regions of the memory respectively, such that image data corresponding to one complete image to be displayed is obtained from one of the plurality of sub-storage regions by one reading operation; and
   controlling the display screen to display images according to the image data in the memory.

2. The method according to claim 1, wherein the compressing the image data of at least two images to be displayed and storing the compressed image data in the memory comprises:

compressing the image data of at least two images to be displayed at a preset compression ratio and storing the compressed image data in the memory.

3. The method according to claim 2, wherein the compressing the image data of at least two images to be displayed at the preset compression ratio and storing the compressed image data in the memory comprises:
sending a partitioning instruction to the memory so that a storage region of the memory is partitioned into the plurality of sub-storage regions; and
compressing the image data of the at least two images to be displayed at the preset compression ratio respectively and storing the compressed image data in different sub-storage regions.

4. The method according to claim 1, wherein the at least two images to be displayed are selected from consecutive frames of images of one segment of animation.

5. The method according to claim 1, wherein the display device further comprises a display controller;
the controlling the display screen to display images according to the image data in the memory comprises:
decompressing, by the display controller, the image data in the memory; and
controlling, by the display controller, the display screen to display according to the decompressed image data based on a preset displaying criterion.

6. The method according to claim 5, wherein the preset displaying criterion comprises: a display sequence of at least two images to be displayed, a display position of each image to be displayed, and a display time length of each image to be displayed;
the compressing the image data of at least two images to be displayed and storing the compressed image data in the memory further comprises:
compressing information of the preset displaying criterion and storing the compressed information in the memory.

7. The method according to claim 1, wherein after the controlling the display screen to display images according to the image data in the memory, the method further comprises:
in response to a trigger operation for updating images, compressing the image data of updated images and storing the compressed image data in the memory.

8. The method according to claim 1, further comprising:
in response to an awakening trigger operation, awakening the display screen.

9. A display device, comprising:
a display screen,
memory configured to store different types of data including instructions, wherein the memory has a plurality of sub-storage regions and
a processor configured to:
in response to a screen-off trigger operation, compress image data of at least two images to be displayed and store the compressed image data in the memory wherein the image data of each of the at least two images to be displayed is stored in each of the plurality of sub-storage regions of the memory respectively, such that image data corresponding to one complete image to be displayed is obtained from one of the plurality sub-storage regions by one reading operation; and
control the display screen to display images according to the image data in the memory.

10. The display device according to claim 9, wherein the processor is further configured to:
compress the image data of at least two images to be displayed at a preset compression ratio and store the compressed image data in the memory.

11. The display device according to claim 10, wherein the processor is further configured to:
send a partitioning instruction to the memory so that a storage region of the memory is partitioned into the plurality of sub-storage regions; and
compress the image data of the at least two images to be displayed at the preset compression ratio respectively and store the compressed image data in different sub-storage regions.

12. The display device according to claim 9, wherein the at least two images to be displayed are selected from consecutive frames of images of one segment of animation.

13. The display device according to claim 9, wherein the display device further comprises a display controller;
the display controller is configured to:
decompress the image data in the memory; and
control the display screen to display according to the decompressed image data based on a preset displaying criterion.

14. The display device according to claim 13, wherein the preset displaying criterion comprises: a display sequence of at least two images to be displayed, a display position of each image to be displayed, and a display time length of each image to be displayed;
the processor is further configured to:
compress information of the preset displaying criterion and store the compressed information in the memory.

15. The display device according to claim 9, wherein after controlling the display screen to display images according to the image data in the memory, the processor is further configured to:
in response to a trigger operation for updating images, compress the image data of updated images and store the compressed image data in the memory.

16. The display device according to claim 9, wherein the processor is further configured to:
in response to an awakening trigger operation, awake the display screen.

* * * * *